(12) United States Patent
Ludlow et al.

(10) Patent No.: US 12,442,367 B2
(45) Date of Patent: Oct. 14, 2025

(54) LONG LIFE PUMP TUBING

(71) Applicant: SAINT-GOBAIN PERFORMANCE PLASTICS CORPORATION, Solon, OH (US)

(72) Inventors: James Ludlow, Medina, OH (US); Kathryn J. Morris, Tallmadge, OH (US); Mark F. Colton, Rootstown, OH (US); Michael J. Tzivanis, Chicopee, MA (US)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 462 days.

(21) Appl. No.: 17/643,857

(22) Filed: Dec. 13, 2021

(65) Prior Publication Data

US 2022/0196005 A1 Jun. 23, 2022

Related U.S. Application Data

(60) Provisional application No. 63/127,219, filed on Dec. 18, 2020.

(51) Int. Cl.
| | |
|---|---|
| *F04B 43/00* | (2006.01) |
| *B32B 1/08* | (2006.01) |
| *F04B 43/12* | (2006.01) |
| *F16L 11/08* | (2006.01) |

(52) U.S. Cl.
CPC ...... *F04B 43/0072* (2013.01); *F04B 43/1253* (2013.01); *B32B 1/08* (2013.01); *B32B 2597/00* (2013.01); *F16L 11/086* (2013.01)

(58) Field of Classification Search
CPC .......... F04B 43/0072; F04B 43/1253
See application file for complete search history.

(56) References Cited

U.S. PATENT DOCUMENTS

| | | |
|---|---|---|
| 5,215,450 A | 6/1993 | Tamari |
| 5,336,051 A | 8/1994 | Tamari |
| 6,579,944 B1 | 6/2003 | Abdou-Sabet et al. |
| 7,579,408 B2 | 8/2009 | Walton et al. |

(Continued)

FOREIGN PATENT DOCUMENTS

| | | | |
|---|---|---|---|
| CA | 2233904 A1 | * | 1/1999 |
| JP | H06327763 A | | 11/1994 |

(Continued)

OTHER PUBLICATIONS

English Machine Translation of Description of KR-20060041217-A (Year: 2006).*

(Continued)

*Primary Examiner* — Nathan C Zollinger
(74) *Attorney, Agent, or Firm* — Abel Schillinger, LLP; Chi Suk Kim

(57) ABSTRACT

Systems and methods are disclosed that include providing a tubing construction with at least one layer formed from a thermoplastic vulcanizate (TPV). The tubing construction is suitable for use in pump applications subjected to cyclic loading and unloading. The tubing construction maintains a flowrate stability of +/−10% for an extended period of time to provide consistent fluid dispensing and/or dosing for an extended life of the tubing construction and/or the fluid pump.

13 Claims, 7 Drawing Sheets

(56) References Cited

U.S. PATENT DOCUMENTS

| | | | |
|---|---|---|---|
| 7,645,127 B2 * | 1/2010 | Hagen | F04B 43/1253 417/477.12 |
| 8,012,555 B2 | 9/2011 | Zumbrum | |
| 8,038,917 B2 | 10/2011 | Weng et al. | |
| 8,476,366 B2 | 7/2013 | Walton et al. | |
| 8,481,646 B2 | 7/2013 | Weng et al. | |
| 9,056,447 B2 * | 6/2015 | O'Brien | F16L 11/04 |
| 9,670,351 B2 | 6/2017 | Siddhamalli et al. | |
| 10,036,380 B1 | 7/2018 | Fulmer et al. | |
| 10,578,093 B2 * | 3/2020 | Golub | B32B 27/32 |
| 2007/0190284 A1 * | 8/2007 | Park | B32B 27/06 428/421 |
| 2007/0224063 A1 * | 9/2007 | Postma | F04B 43/1253 417/477.1 |
| 2009/0202759 A1 | 8/2009 | O'Brien et al. | |
| 2011/0240064 A1 * | 10/2011 | Wales | C09D 7/65 428/116 |
| 2020/0182232 A1 | 6/2020 | Galavotti et al. | |
| 2020/0347209 A1 | 11/2020 | Takacs et al. | |

FOREIGN PATENT DOCUMENTS

| | | |
|---|---|---|
| JP | H10002465 A | 1/1998 |
| JP | 2001106848 A | 4/2001 |
| JP | 2007270832 A | 10/2007 |
| JP | 2009542476 A | 12/2009 |
| JP | 2012112439 A | 6/2012 |
| KR | 20060041217 A * | 5/2006 |
| WO | 94283091 A1 | 12/1994 |
| WO | 2006022666 A1 | 3/2006 |
| WO | WO-2019045870 A1 * | 3/2019 ............... B29B 7/48 |
| WO | 2022133412 A1 | 6/2022 |

OTHER PUBLICATIONS

Santoprene Data Sheet "SDS" (Exxon Mobil, Santoprene 101-64, 2017) (Year: 2017).*

Pressure Seals "PS" (Physical properties of Santoprene, Oct. 2020) (Year: 2020).*

Pressure Seals, Inc. (https://www.pressureseal.com/Santoprene/Santoprene%20Physical%20Properties.pdf, internet archived date of Oct. 12, 2020) (Year: 2020).*

"Santoprene 181-555MED—Thermoplastic Vulcanizate", Product Datasheet, ExxonMobil, https://www.exxonmobilchemical.com/en/products/tpv, 2 pages.

International Search Report and Written Opinion for PCT/US2021/072870, mailed Apr. 21, 2022, 12 pages.

Extended European Search Report for EP21908010.8, dated Oct. 22, 2024, 8 pages.

Purvis M: "Product focus: peristaltic pumps", World Pumps, Elsevier Advanced Technology, GB, vol. 1995, No. 343, Apr. 1, 1995 (Apr. 1, 1995), pp. 24-28, XP004176521, ISSN: 0262-1762, 4 pages.

* cited by examiner

LONG LIFE PUMP TUBING

CROSS-REFERENCE TO RELATED APPLICATION(S)

This application claims priority under 35 U.S.C. § 119(e) to U.S. Provisional Application No. 63/127,219, entitled "LONG LIFE PUMP TUBING," by James LUDLOW et al., filed Dec. 18, 2020, which is assigned to the current assignee hereof and incorporated herein by reference in its entirety.

BACKGROUND OF THE INVENTION

Peristaltic pumps are used in a variety of fluid transfer industries, including biopharmaceutical fluid dispensing and transfer, chemical fluid dispensing and transfer, and medical fluid dispensing, dosing, and transfer applications. These applications often require consistent and predictable dosing or dispensing and/or extended pump life. However, fluid dispensing with peristaltic pumps is very demanding on pump tubing. The cyclic loading and unloading on the pump tubing can result in dimensional changes, fatigue, fracture, and ultimately failure of the pump tubing. Accordingly, these industries continue to demand improvements in pump tubing technology.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
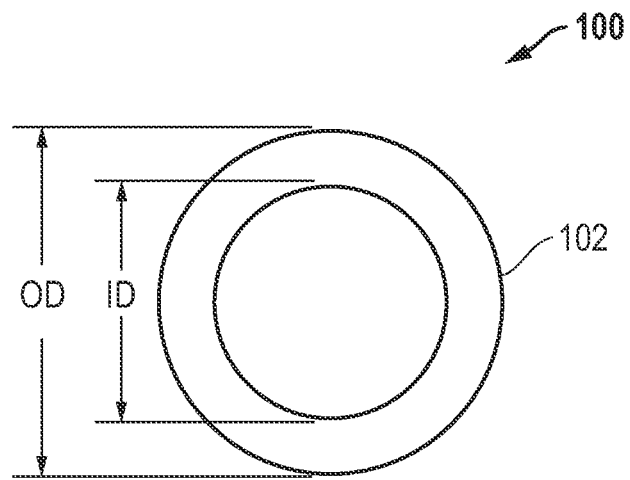
FIG. 1 is a cross-sectional view of a tubing construction according to an embodiment of the disclosure.

FIG. 1 shows a cross-sectional view of a tubing construction 100 according to an embodiment of the disclosure. The tubing construction 100 may generally comprise an inner diameter (ID) through which fluid may be carried, pumped, or transferred and an outer diameter (OD). The tubing construction 100 may be suitable for biopharmaceutical, chemical, medical, or other applications requiring the transport of fluids. The tubing construction 100 may be suitable for applications requiring consistent fluid dispensing and/or dosing, extended tubing life, and/or extended fluid pump life. The tubing construction 100 may also be highly resilient and suitable for use in applications, such as in a peristaltic pump, where the tubing construction 100 is subjected to cyclic loading and unloading, while providing consistent fluid dispensing and/or dosing for an extended life of the tubing construction 100 and/or the fluid pump.

The tubing construction 100 may generally comprise at least one layer 102. In some embodiments, the at least one layer 102 of the tubing construction 100 may be formed from a thermoplastic vulcanizate (TPV). In some embodiments, the TPV may be formed via dynamic vulcanization of a rubber component during melt mixing with a semicrystalline thermoplastic component at an elevated temperature. In some embodiments, the at least one layer 102 of the tubing construction 100 may be formed from a TPV comprising a crosslinked rubber and a thermoplastic resin. In some embodiments, the crosslinked rubber may be a synthetic rubber. In some embodiments, the crosslinked rubber may be ethylene propylene diene monomer (EPDM). In some embodiments, the thermoplastic resin may comprise polypropylene. Further, in some embodiments, the at least one layers 102 of the tubing construction 100 may be extruded to form the tubing construction 100.

In some embodiments, the tubing construction 100 may comprise a beneficial Shore A Hardness Durometer. In some embodiments, the Shore A Hardness may be at least 25A. In some embodiments, the Shore A Hardness may be not greater than 75A. In some embodiments, the Shore A Hardness may be 25A, 30A, 35A, 40A, 45A, 50A, 55A, 65A, or 75A.

The tubing construction 100 may generally comprise one or more properties that make the tubing construction 100 highly resilient, durable, and resistant to dimensional changes, fatigue, fracture, and failure and capable of providing enhanced and extended performance over traditional tubing constructions when subjected to cyclic loading and unloading over an extended period of time. In some embodiments, the tubing construction 100 may comprise a beneficial fluid flowrate stability, defined as the change (+/−) in flowrate over a predetermined or extended period of time. In some embodiments, the fluid flowrate stability may be within or not greater than +/−15%, not greater than +/−14%, not greater than +/−13%, not greater than +/−12%, not greater than +/−11%, not greater than +/−10%, not greater than +/−9%, not greater than +/−8%, not greater than +/−7%, not greater than +/−6%, or not greater than +/−5% of the original flowrate of the tubing construction 100 for the predetermined or extended period of time. In some embodiments, the predetermined or extended period of time may be at least 250 hours, at least 300 hours, at least 350 hours, at least 400 hours, at least 450 hours, at least 500 hours, at least 550 hours, at least 600 hours, at least 750 hours, at least 1000 hours, at least 1500 hours, at least 2500 hours, at least 5000 hours, or at least 10000 hours.

In some embodiments, the tubing construction 100 may comprise a beneficial compression set. Compression set is defined as the amount of permanent deformation that occurs when a material is compressed to for a specified time at a specific temperature. In some embodiments, the compression set may be not greater than 26%, not greater than 25%, not greater than 24%, not greater than 23%, not greater than 22%, not greater than 21%, not greater than 20%, not greater than 19%, not greater than 18%, not greater than 17%, not greater than 16%, or not greater than 15%. In some embodiments, the compression set may be evaluated for at least 15 hours, at least 20 hours, at least 21 hours, at least 22 hours, at least 23 hours, or at least 24 hours. In some embodiments, the compression set may be evaluated at a temperature of at least 150 degrees Fahrenheit, at least 151 degrees Fahrenheit, at least 152 degrees Fahrenheit, at least 153 degrees Fahrenheit, at least 154 degrees Fahrenheit, at least 155 degrees Fahrenheit, at least 156 degrees Fahrenheit, at least 157 degrees Fahrenheit, at least 158 degrees Fahrenheit, at least 159 degrees Fahrenheit, at least 160 degrees Fahrenheit, at least 170 degrees Fahrenheit, at least 175 degrees Fahrenheit, or at least 180 degrees Fahrenheit. In a specific embodiment, a tubing construction 100 having a 55A Shore A Hardness may comprise a compression set of not greater than 23%. In another specific embodiment, a tubing construction 100 having a 65A Shore A Hardness may comprise a compression set of not greater than 18%.

In some embodiments, the tubing construction 100 may be highly resilient and comprise a beneficial vertical rebound according to the Bashore rebound test under ASTM D2632-15. In some embodiments, the vertical rebound may be at least 48%, at least 49%, at least 50%, at least 51%, at least 52%, at least 53%, at least 54%, or at least 55%. In a specific embodiment, a tubing construction 100 having a 55A Shore A Hardness may comprise a vertical rebound of at least 55%. In another specific embodiment, a tubing construction 100 having a 65A Shore A Hardness may comprise a vertical rebound of at least 51%.

In some embodiments, the tubing construction 100 may comprise a beneficial crosslink density. In some embodiments, the crosslink density may be at least $0.005 \times 10^{-3}$ mol/cm$^3$, at least $0.010 \times 10^{-3}$ mol/cm$^3$, at least $0.015 \times 10^{-3}$ mol/cm$^3$, at least $0.020 \times 10^{-3}$ mol/cm$^3$, at least $0.025 \times 10^{-3}$ mol/cm$^3$, at least $0.05 \times 10^{-3}$ mol/cm$^3$, at least $0.10 \times 10^{-3}$ mol/cm$^3$, at least $0.25 \times 10^{-3}$ mol/cm$^3$, at least $0.5 \times 10^{-3}$ mol/cm$^3$, at least $0.75 \times 10^{-3}$ mol/cm$^3$, at least $1 \times 10^{-3}$ mol/cm$^3$, at least $2 \times 10^{-3}$ mol/cm$^3$, at least $3 \times 10^{-3}$ mol/cm$^3$, at least $4 \times 10^{-3}$ mol/cm$^3$, at least $5 \times 10^{-3}$ mol/cm$^3$, at least $6 \times 10^{-3}$ mol/cm$^3$, at least $7 \times 10^{-3}$ mol/cm$^3$, at least $8 \times 10^{-3}$ mol/cm$^3$, at least $9 \times 10^{-3}$ mol/cm$^3$, or at least $10 \times 10^{-3}$ mol/cm$^3$. In some embodiments, the crosslink density may be not greater than $15 \times 10^{-3}$ mol/cm$^3$, not greater than $14 \times 10^{-3}$ mol/cm$^3$, not greater than $13 \times 10^{-3}$ mol/cm$^3$, not greater than $12 \times 10^{-3}$ mol/cm$^3$, not greater than $11 \times 10^{-3}$ mol/cm$^3$, not greater than $10 \times 10^{-3}$ mol/cm$^3$, not greater than $9 \times 10^{-3}$ mol/cm$^3$, not greater than $8 \times 10^{-3}$ mol/cm$^3$, not greater than $7 \times 10^{-3}$ mol/cm$^3$, not greater than $6 \times 10^{-3}$ mol/cm$^3$, or not greater than $5 \times 10^{-3}$ mol/cm$^3$. Further, it will be appreciated that the crosslink density may be between any of these minimum and maximum values, such as at least $0.005 \times 10^{-3}$ mol/cm$^3$ to not greater than $15 \times 10^{-3}$ mol/cm$^3$, or even at least $5 \times 10^{-3}$ mol/cm$^3$ to not greater than $10 \times 10^{-3}$ mol/cm$^3$.

In some embodiments, the tubing construction 100 may comprise a beneficial tan delta. In some embodiments, the tan delta may be not greater than 0.12, not greater than 0.11, or not greater than 0.10. In some embodiments, the tan delta may be not greater than 0.12, not greater than 0.11, or not greater than 0.10 as measured at about 23 degrees Celsius and a frequency of about 10 Hertz (Hz).

In some embodiments, the tubing construction 100 may comprise a beneficial combination of any of these beneficial properties. In some embodiments, the tubing construction 100 may comprise a combination of a beneficial Shore A Hardness, flowrate stability, compression set, vertical rebound, crosslink density, and/or tan delta values. For example, in some embodiments, the tubing construction 100 may comprise a Shore A Hardness of at least 20A to not greater than 90A, or even at least 40A to not greater than 70A, a flowrate stability of not greater than +/−10% for a period of at least 500 hours, a compression set of not greater than 26% at a temperature of at least 150 degrees Fahrenheit for at least 20 hours, a vertical rebound of at least 50%, a crosslink density of at least $0.005 \times 10^{-3}$ mol/cm$^3$ to not greater than $15 \times 10^{-3}$ mol/cm$^3$, and/or a tan delta of not greater than 0.10 as measured at about 23 degrees Celsius and a frequency of about 10 Hertz (Hz).

The tubing construction 100 may comprise dimensions that make the tubing construction 100 suitable for specific applications. In some embodiments, the tubing construction 100 may comprise an inner diameter of at least 0.0625 inches, at least 0.125 inches, at least 0.25 inches, at least 0.375 inches, or at least 0.50 inches. In some embodiments, the tubing construction 100 may comprise an outer diameter of at least 0.125 inches, at least 0.25 inches, at least 0.50 inches, at least 0.75 inches, or at least 1.0 inches. For example, in particular embodiments, the tubing construction 100 may comprise an inner diameter of 0.255 inches and an outer diameter of 0.385 inches. However, in other embodiments, the tubing construction 100 may comprise dimensions suitable for any particular application.

Figure 2:
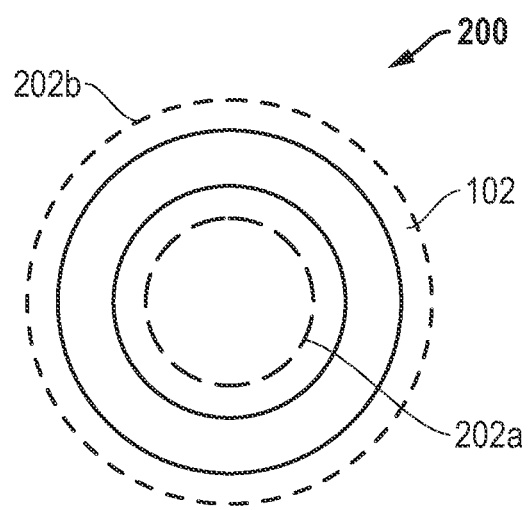
FIG. 2 is a cross-sectional view of a multilayer tubing construction according to an embodiment of the disclosure.

FIG. 2 is a cross-sectional view of a multilayer tubing construction 200 according to an embodiment of the disclosure. at least one layer formed from a thermoplastic vulcanizate (TPV) comprising a crosslinked rubber and a thermoplastic resin. We would also include and claim the above-referenced performance and morphology data for the multi-layer tubing once available. In some embodiments, the multilayer tubing construction 200 may comprise a plurality of layers 102, 202. In some embodiments, the multilayer tubing construction 200 may comprise the at least one layer 102 of the tubing construction 100 that is formed from the thermoplastic vulcanizate (TPV) and one or more additional layers 202. In some embodiments, the multilayer tubing construction 200 may comprise one or more additional inner layers 202a, one or more additional outer layers 202b, or a combination thereof. In some embodiments, the at least one layer 102 may be the innermost layer of the multilayer tubing construction 200. In some embodiments, the at least one layer 102 may be the outermost layer of the multilayer tubing construction 200.

In some embodiments, the one or more additional layers 202 may be formed from a polymeric material. In some embodiments, the one or more additional layers 202 may be formed from a thermoplastic material. In some embodiments, the one or more additional layers 202 may be formed from a rubber material. In some embodiments, the one or more additional layers 202 may be formed from a thermoplastic vulcanizate (TPV) substantially similar to the layer 102 of tubing construction 100. Further, in some embodiments, the at least one layer 102 and the one or more additional layers 202 of the multilayer tubing construction 200 may be coextruded to form the multilayer tubing construction 200.

In some embodiments, the multilayer tubing construction 200 may be substantially similar to tubing construction 100 and be suitable for substantially similar applications. In some embodiments, the multilayer tubing construction 200 may comprise substantially similar properties and/or performance characteristics as the tubing construction 100 that provide improved flowrate stability, improved compression set, improved vertical rebound, beneficial crosslink density, beneficial tan delta, or any combination thereof.

The multilayer tubing construction 200 may further comprise dimensions that make the multilayer tubing construction 200 suitable for specific applications. In some embodiments, the multilayer tubing construction 200 may comprise an inner diameter of at least 0.0625 inches, at least 0.125 inches, at least 0.25 inches, at least 0.375 inches, or at least 0.50 inches. In some embodiments, the multilayer tubing construction 200 may comprise an outer diameter of at least 0.125 inches, at least 0.25 inches, at least 0.50 inches, at least 0.75 inches, or at least 1.0 inches. For example, in particular embodiments, the multilayer tubing construction 200 may comprise an inner diameter of 0.255 inches and an outer diameter of 0.385 inches. However, in other embodiments, the multilayer tubing construction 200 may comprise dimensions suitable for any particular application.

Figure 3:
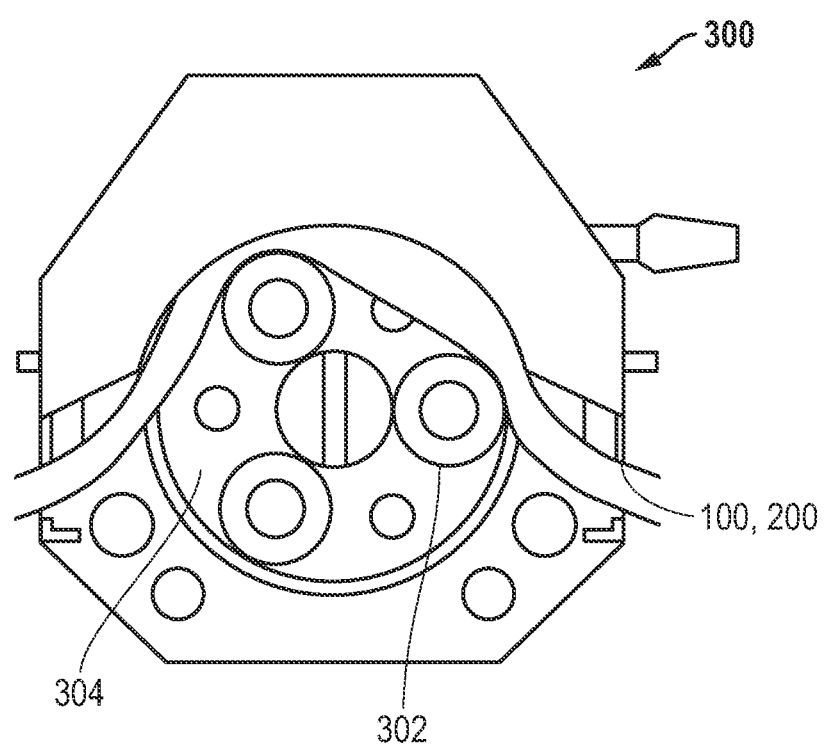
FIG. 3 is a cross-sectional view of a portion of a fluid pump according to an embodiment of the disclosure.

FIG. 3 shows a cross-sectional view of a portion of a fluid pump 300 according to an embodiment of the disclosure. In some embodiments, the fluid pump 300 may comprise a peristaltic pump. In some embodiments, the fluid pump 300 may comprise a tubing construction 100. In some embodiments, the fluid pump 300 may comprise a multilayer tubing construction 200. Further, in some embodiments, the fluid pump 300 may comprise one or more rollers 302 coupled to a rotor and configured to subject the tubing construction 100 or the multilayer tubing construction 200 to cyclic loading and unloading to force fluid through the tubing construction 100 or the multilayer tubing construction 200.

Figure 4:
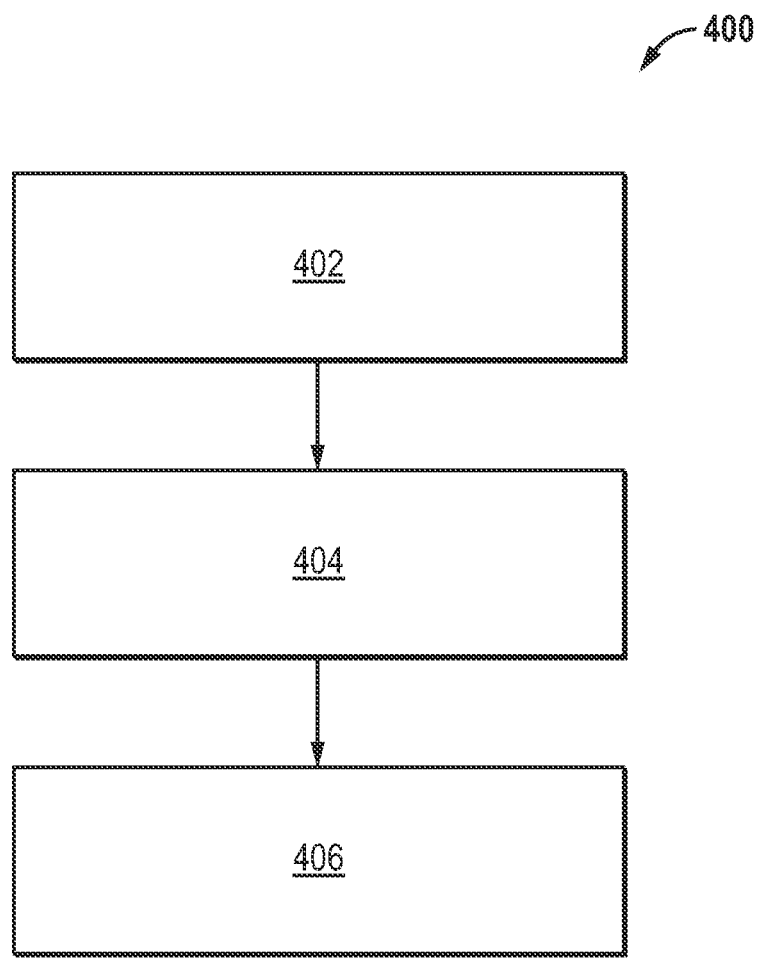
FIG. 4 is a flowchart of a method of operating a fluid pump according to an embodiment of the disclosure.

FIG. 4 shows a flowchart of a method 400 of operating a fluid pump 300 according to an embodiment of the disclosure. The method 400 may begin at block 402 by providing a fluid pump 300 comprising a tubing construction 100, 200 according to embodiments disclosed herein. The method 400 may continue at block 404 by beginning operation of the fluid pump 300 at an initial fluid flowrate. The method 400 may continue at block 406 by maintaining a fluid flowrate within 10% of the initial fluid flowrate for a predetermined period of time. In some embodiments, the predetermined period of time may be at least 250 hours, at least 300 hours, at least 350 hours, at least 400 hours, at least 450 hours, at least 500 hours, at least 550 hours, at least 600 hours, at least 750 hours, at least 1000 hours, at least 1500 hours, at least 2500 hours, at least 5000 hours, or at least 10000 hours.

EXAMPLES

Figure 5:
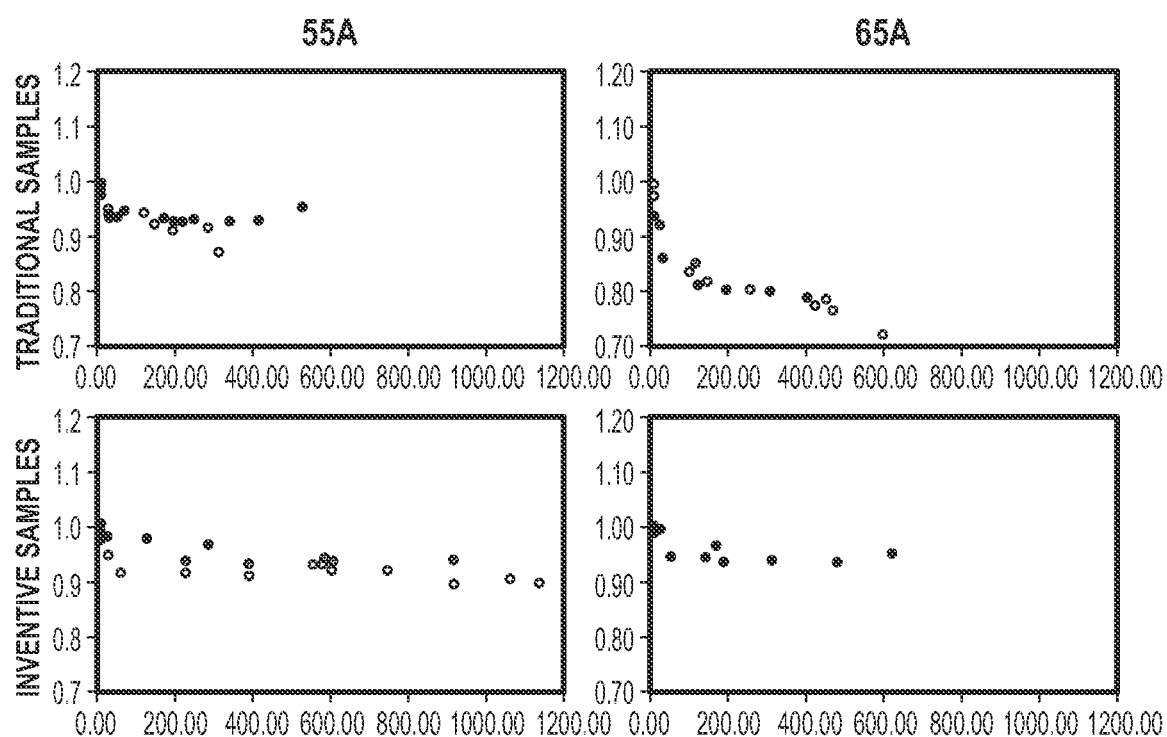
FIG. 5 shows graphs of comparative fluid flowrate data of traditional tubing constructions and exemplary embodiments of tubing constructions.

FIG. 5 shows graphs of comparative fluid flowrate data of traditional tubing constructions (C1 and C2) and exemplary embodiments (S1 and S2) of tubing constructions 100. Each of C1, C2, S1, and S2 were constructed from single layer tubing having an inner diameter (ID) of 0.255 inches and an outer diameter (OD) of 0.385 inches. C1 and S1 were compared and have a Shore A Hardness of 55A. C2 and S2 were compared and have a Shore A Hardness of 65A. The initial flowrate of each of C1, C2, S1, and S2 was recorded (shown as 1.0 in the graphs). The graphs show a plot of the fraction of the original flowrate versus time (hours). Each of C1, C2, S1, and S2 were tested for extended operation periods of time as shown in a fluid pump at a continuous 600 RPM at a backpressure of 10 psi. C1 falls below a flowrate stability of +/−10% at about 300 hours, whereas S1 maintained a flowrate stability of +/−10% for at least about 900 hours. The results show that S1 maintains a flowrate stability of +/−10% for about 300% longer as compared to C1. C2 rapidly falls below a flowrate stability of +/−10% at about 15 hours, whereas S2 maintained a flowrate stability of +/−10% for at least about 600 hours. The results show that S2 maintains a flowrate stability of +/−10% for about 4000% longer than C2. The extended flowrate stability of S1 and S2 may be translated to maintaining an accurate dispensing or dosing for an extended amount of time and/or providing a longer pump life as compared to C1 and C2.

Figure 6:
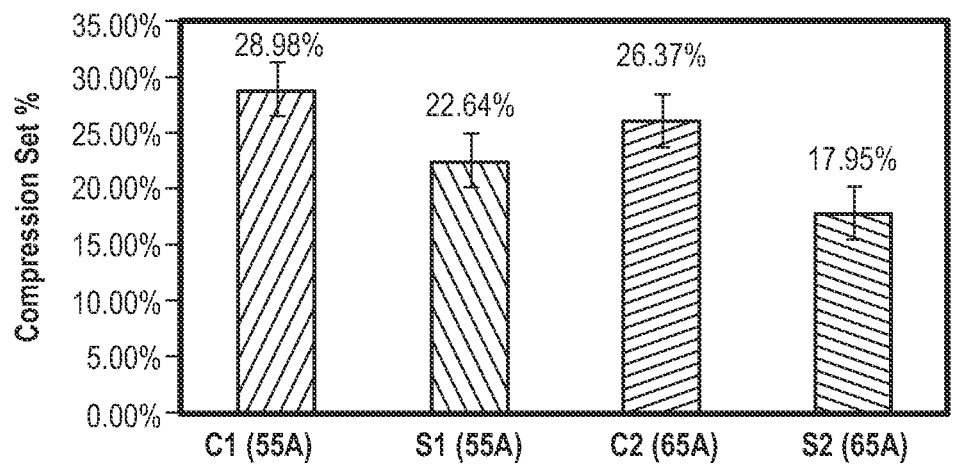
FIG. 6 shows a graph of comparative compression set data of traditional tubing constructions and exemplary embodiments of tubing constructions.

FIG. 6 shows a graph of comparative compression set data of traditional tubing constructions (C1 and C2) and exemplary embodiments (S1 and S2) of tubing constructions 100. Each of C1, C2, S1, and S2 were constructed from single layer tubing having an inner diameter (ID) of 0.255 inches and an outer diameter (OD) of 0.385 inches. C1 and S1 were compared and have a Shore A Hardness of 55A. C2 and S2 were compared and have a Shore A Hardness of 65A. Each of C1, C2, S1, and S2 were equally compressed for a period of about 22 hours at a temperature of 158 degrees Fahrenheit. The compressive force was removed and the compression set values were measured. C1 demonstrated a compression set of 28.98%, whereas S1 demonstrated a compression set of 22.64%. The results show that S1 suffers over 6% less compression set and is therefore more resilient as compared to C1. C2 demonstrated a compression set of 26.37%, whereas S2 demonstrated a compression set of 17.95%. The results show that S2 suffers over 8% less compression set and is therefore more resilient as compared to C2.

Figure 7:
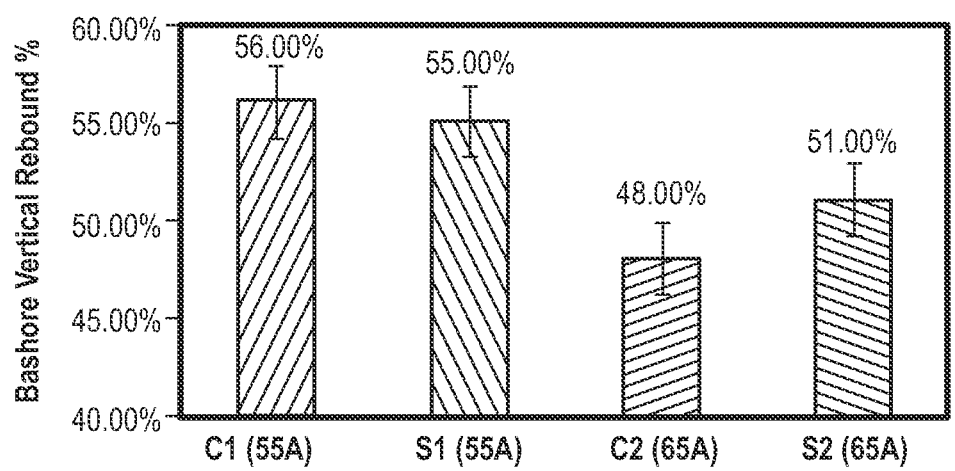
FIG. 7 shows a graph of comparative vertical rebound data of traditional tubing constructions and exemplary embodiments of tubing constructions.

FIG. 7 shows a graph of comparative vertical rebound data of traditional tubing constructions (C1 and C2) and exemplary embodiments (S1 and S2) of tubing constructions 100. Each of C1, C2, S1, and S2 were constructed from single layer tubing having an inner diameter (ID) of 0.255 inches and an outer diameter (OD) of 0.385 inches. C1 and S1 were compared and have a Shore A Hardness of 55A. C2 and S2 were compared and have a Shore A Hardness of 65A. Each of C1, C2, S1, and S2 were subjected to a Bashore vertical rebound test in accordance with ASTM D2632-15. C1 demonstrated a vertical rebound of 56%, whereas S1 demonstrated a comparable vertical rebound of 55%. The results show that S1 has a substantially similar vertical rebound as compared to C1. C2 demonstrated a vertical rebound of 48%, whereas S2 demonstrated a vertical rebound of 51%. The results shows that S2 has a 3% better vertical rebound and is therefore more responsive to rapid deformation as compared to C2.

Figure 8:
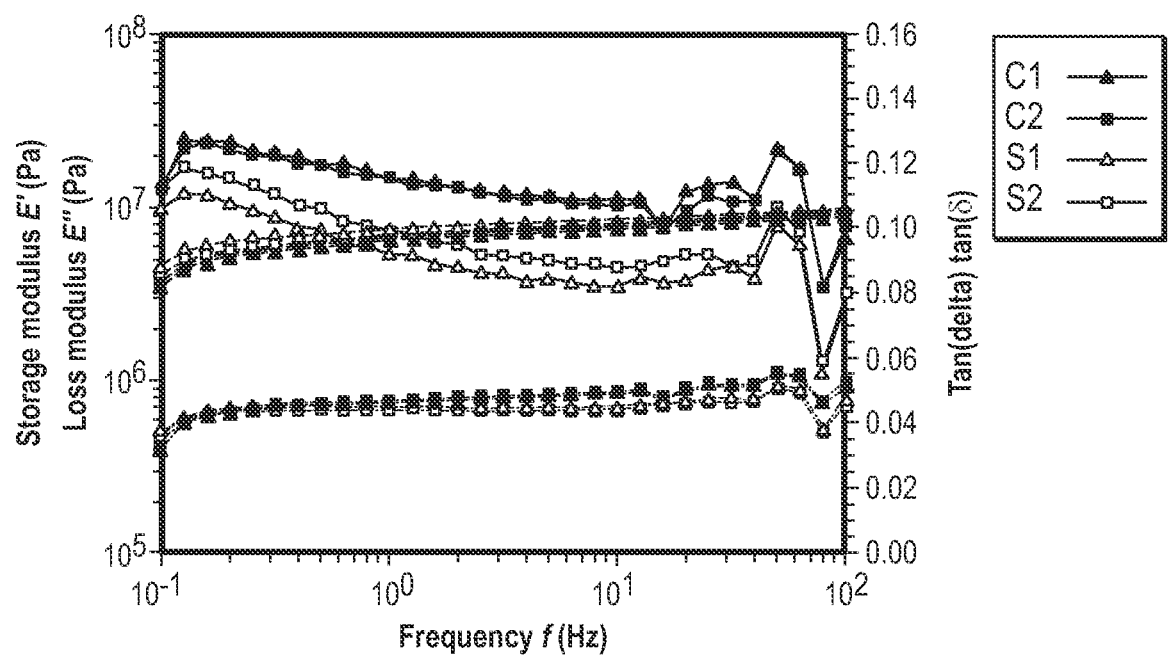
FIG. 8 shows a graph of comparative data of traditional tubing constructions and exemplary embodiments of tubing constructions.

FIG. 8 shows a graph of comparative data of traditional tubing constructions (C1 and C2) and exemplary embodiments (S1 and S2) of tubing constructions 100. Each of C1, C2, S1, and S2 were constructed from single layer tubing having a Shore A Hardness of 55A. The results show that S1 and S2 have a lower tan delta value at all frequencies and a slightly lower loss modulus at all frequencies as compared to C1 and C2. The storage modulus remained similar. These results show that S1 and S2 would contribute to better pump performance (flowrate stability and pump life) as compared to C1 and C2.

Figure 9:
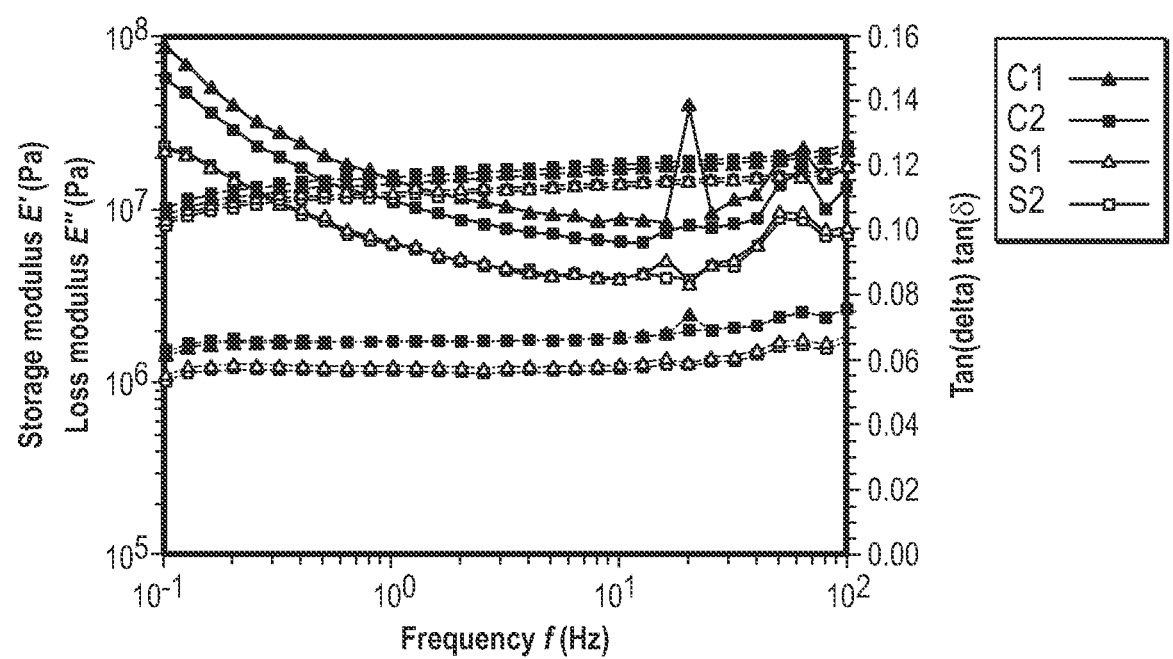
FIG. 9 shows a graph of comparative data of traditional tubing constructions and exemplary embodiments of tubing constructions.

FIG. 9 shows a graph of comparative data of traditional tubing constructions (C1 and C2) and exemplary embodiments (S1 and S2) of tubing constructions 100. Each of C1, C2, 51, and S2 were constructed from single layer tubing having a Shore A Hardness of 65A. The results show that S1 and S2 have a lower tan delta value at all frequencies, a slightly lower loss modulus at all frequencies, and a slightly lower storage modulus at all frequencies as compared to C1 and C2. These results show that S1 and S2 would contribute to better pump performance (flowrate stability and pump life) as compared to C1 and C2.

In still other embodiments, the tubing construction 100, the multilayer tubing construction 200, and/or the method 300 of operating a fluid pump may include one or more of the following embodiments:

Embodiment 1. A tubing construction, comprising: at least one layer formed from a thermoplastic vulcanizate (TPV).

Embodiment 2. The tubing construction of embodiment 1, wherein the TPV is formed via dynamic vulcanization of a rubber component during melt mixing with a semicrystalline thermoplastic component at an elevated temperature.

Embodiment 3. The tubing construction of any of embodiments 1 to 2, wherein the TPV comprises a crosslinked rubber and a thermoplastic resin.

Embodiment 4. The tubing construction of embodiment 3, wherein the crosslinked rubber is a synthetic rubber.

Embodiment 5. The tubing construction of any of embodiments 3 to 4, wherein the crosslinked rubber is ethylene propylene diene monomer (EPDM).

Embodiment 6. The tubing construction of any of embodiments 3 to 5, wherein the thermoplastic is polypropylene.

Embodiment 7. The tubing construction of any of embodiments 1 to 6, wherein the at least one layer is extruded to form the tubing construction.

Embodiment 8. The tubing construction of any of embodiments 1 to 7, wherein the tubing construction comprises a Shore A Hardness of 25A, 30A, 35A, 40A, 45A, 50A, 55A, 65A, or 75A.

Embodiment 9. The tubing construction of any of embodiments 1 to 8, wherein the tubing construction comprises a fluid flowrate stability of not greater than +/−15%, not greater than +/−14%, not greater than +/−13%, not greater than +/−12%, not greater than +/−11%, not greater than +/−10%, not greater than +/−9%, not greater than +/−8%, not greater than +/−7%, not greater than +/−6%, or not greater than +/−5% of the original flowrate of the tubing construction for a predetermined or extended period of time.

Embodiment 10. The tubing construction of embodiment 9, wherein the predetermined or extended period of time is at least 250 hours, at least 300 hours, at least 350 hours, at least 400 hours, at least 450 hours, at least 500 hours, at least 550 hours, at least 600 hours, at least 750 hours, at least 1000 hours, at least 1500 hours, at least 2500 hours, at least 5000 hours, or at least 10000 hours.

Embodiment 11. The tubing construction of embodiment 10, wherein the tubing construction comprises a flowrate stability of not greater than +/−10% for a predetermined or extended period of at least 500 hours.

Embodiment 12. The tubing construction of any of embodiments 1 to 11, wherein the tubing construction comprises a compression set of not greater than 26%, not greater than 25%, not greater than 24%, not greater than 23%, not greater than 22%, not greater than 21%, not greater than 20%, not greater than 19%, not greater than 18%, not greater than 17%, not greater than 16%, or not greater than 15%.

Embodiment 13. The tubing construction of embodiment 12, wherein the compression set is evaluated for at least 15 hours, at least 20 hours, at least 21 hours, at least 22 hours, at least 23 hours, or at least 24 hours.

Embodiment 14. The tubing construction of embodiment 13, wherein the compression set is evaluated at a temperature of at least 150 degrees Fahrenheit, at least 151 degrees Fahrenheit, at least 152 degrees Fahrenheit, at least 153 degrees Fahrenheit, at least 154 degrees Fahrenheit, at least 155 degrees Fahrenheit, at least 156 degrees Fahrenheit, at least 157 degrees Fahrenheit, at least 158 degrees Fahrenheit, at least 159 degrees Fahrenheit, at least 160 degrees Fahrenheit, at least 170 degrees Fahrenheit, at least 175 degrees Fahrenheit, or at least 180 degrees Fahrenheit.

Embodiment 15. The tubing construction of any of embodiments 12 to 14, wherein the tubing construction comprises a 55A Shore A Hardness and a compression set of not greater than 23%.

Embodiment 16. The tubing construction of any of embodiments 11 to 13, wherein the tubing construction comprises a 65A Shore A Hardness and a compression set of not greater than 18%.

Embodiment 17. The tubing construction of any of embodiments 1 to 16, wherein the tubing construction comprises a vertical rebound according to the Bashore rebound test under ASTM D2632-15 of at least 50%, at least 51%, at least 52%, at least 53%, at least 54%, or at least 55%.

Embodiment 18. The tubing construction of embodiment 17, wherein the tubing construction comprises a 55A Shore A Hardness and a vertical rebound of at least 55%.

Embodiment 19. The tubing construction of embodiment 17, wherein the tubing construction comprises a 65A Shore A Hardness and a vertical rebound of at least 51%.

Embodiment 20. The tubing construction of any of embodiments 1 to 19, wherein the tubing construction comprises a crosslink density of at least 0.005×10-3 mol/cm3, at least 0.010×10-3 mol/cm3, at least 0.015×10-3 mol/cm3, at least 0.020×10-3 mol/cm3, at least 0.025×10-3 mol/cm3, at least 0.05×10-3 mol/cm3, at least 0.10×10-3 mol/cm3, at least 0.25×10-3 mol/cm3, at least 0.5×10-3 mol/cm3, at least 0.75×10-3 mol/cm3, at least 1×10-3 mol/cm3, at least 2×10-3 mol/cm3, at least 3×10-3 mol/cm3, at least 4×10-3 mol/cm3, at least 5×10-3 mol/cm3, at least 6×10-3 mol/cm3, at least 7×10-3 mol/cm3, at least 8×10-3 mol/cm3, at least 9×10-3 mol/cm3, or at least 10×10-3 mol/cm3.

Embodiment 21. The tubing construction of any of embodiments 1 to 20, wherein the tubing construction comprises a crosslink density of not greater than 15×10-3 mol/cm3, not greater than 14×10-3 mol/cm3, not greater than 13×10-3 mol/cm3, not greater than 12×10-3 mol/cm3, not greater than 11×10-3 mol/cm3, not greater than 10×10-3 mol/cm3, not greater than 9×10-3 mol/cm3, not greater than 8×10-3 mol/cm3, not greater than 7×10-3 mol/cm3, not greater than 6×10-3 mol/cm3, or not greater than 5×10-3 mol/cm3.

Embodiment 22. The tubing construction of any of embodiments 1 to 21, where the tubing construction comprises a tan delta of not greater than 0.12, not greater than 0.11, or not greater than 0.10.

Embodiment 23. The tubing construction of any of embodiments 1 to 22, where the tubing construction comprises a tan delta of not greater than 0.12, not greater than 0.11, or not greater than 0.10 as measured at about 23 degrees Celsius and a frequency of about 10 Hertz (Hz).

Embodiment 24. The tubing construction of any of embodiments 1 to 23, wherein the tubing construction comprises a Shore A Hardness of at least 50A to not greater than 70A, a flowrate stability of not greater than +/−10% for a period of at least 500 hours, a compression set of not greater than 26% at a temperature of at least 150 degrees Fahrenheit for at least 20 hours, a vertical rebound of at least 50%, a crosslink density of at least 0.005×10-3 mol/cm3 to not greater than 15×10-3 mol/cm3, and/or a tan delta of not greater than 0.10 as measured at about 23 degrees Celsius and a frequency of about 10 Hertz (Hz).

Embodiment 25. The tubing construction of embodiment 24, wherein the tubing construction comprises a 55A Shore A Hardness, a flowrate stability of +/−10% for a predetermined or extended period of at least 500 hours, a compression set of not greater than 23% at a temperature of at least 150 degrees Fahrenheit for at least 20 hours, and a vertical rebound of at least 55%.

Embodiment 26. The tubing construction of embodiment 24, wherein the tubing construction comprises a 65A Shore A Hardness, a flowrate stability of +/−10% for a predetermined or extended period of at least 500 hours, a compression set of not greater than 18% at a temperature of at least 150 degrees Fahrenheit for at least 20 hours, and a vertical rebound of at least 51%.

Embodiment 27. The tubing construction of any of embodiments 1 to 26, wherein the tubing construction is a multilayer tubing construction comprising one or more additional layers.

Embodiment 28. The tubing construction of embodiment 27, wherein the one or more additional layers comprise one or more inner layers, one or more outer layers, or a combination thereof.

Embodiment 29. The tubing construction of any of embodiments 27 to 28, wherein the at least one layer formed from the thermoplastic vulcanizate (TPV) is the innermost layer of the multilayer tubing construction.

Embodiment 30. The tubing construction of any of embodiments 27 to 28, wherein the at least one layer formed from the thermoplastic vulcanizate (TPV) is the outermost layer of the multilayer tubing construction.

Embodiment 31. The tubing construction of any of embodiments 27 to 30, wherein the at least one additional layer is formed from a polymeric material.

Embodiment 32. The tubing construction of any of embodiments 27 to 30, wherein the at least one additional layer is formed from a thermoplastic material.

Embodiment 33. The tubing construction of any of embodiments 27 to 30, wherein the at least one additional layer is formed from a rubber material.

Embodiment 34. The tubing construction of any of embodiments 27 to 30, wherein the at least one additional layer is formed from a thermoplastic vulcanizate (TPV).

Embodiment 35. The tubing construction of any of embodiments 27 to 34, wherein the at least one layer and the one or more additional layers are coextruded to form the multilayer tubing construction.

Embodiment 36. A fluid pump, comprising: a tubing construction according to any of embodiments 1 to 35; and a rotor comprising one or more rollers configured to subject the tubing construction to cyclic loading and unloading to force fluid through the tubing construction.

Embodiment 37. The fluid pump of embodiment 36, wherein the pump comprises a peristaltic pump.

Embodiment 38. A method of operating a fluid pump, comprising: providing a fluid pump comprising a tubing construction according to any of embodiments 1 to 35; beginning operation of the fluid pump at an initial fluid flowrate; and maintaining a fluid flowrate not greater than +/−10% of the initial fluid flowrate for a predetermined period of time.

Embodiment 39. The method of embodiment 38, wherein the fluid pump comprises a peristaltic pump having a rotor comprising one or more rollers configured to subject the tubing construction to cyclic loading and unloading to force fluid through the tubing construction.

Embodiment 40. The method of any of embodiments 38 to 39, wherein the predetermined period of time is at least 250 hours, at least 300 hours, at least 350 hours, at least 400 hours, at least 450 hours, at least 500 hours, at least 550 hours, at least 600 hours, at least 750 hours, at least 1000 hours, at least 1500 hours, at least 2500 hours, at least 5000 hours, or at least 10000 hours.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A tubing construction, comprising:
at least one layer formed from a thermoplastic vulcanizate (TPV),
wherein the tubing construction comprises a vertical rebound according to the Bashore rebound test under ASTM D2632-15 of not less than 50% and a tan delta of not greater than 0.10 as measured at 23 degrees Celsius and a frequency of 10 Hertz (Hz),
wherein the tubing construction comprises a Shore A Hardness of not less than 50A to not greater than 70A, a flowrate stability of not greater than +/−10% for a period of not less than 500 hours, a compression set of not greater than 26% at a temperature of not less than 150 degrees Fahrenheit for not less than 20 hours, or a crosslink density of not less than $0.005 \times 10^{-3}$ mol/cm$^3$ to not greater than $15 \times 10^{-3}$ mol/cm$^3$,
wherein the TPV comprises a crosslinked rubber and a thermoplastic resin.

2. The tubing construction of claim 1, wherein the TPV is formed via dynamic vulcanization of the crosslinked rubber during melt mixing with the thermoplastic resin component at an elevated temperature.

3. The tubing construction of claim 1, wherein the tubing construction comprises a vertical rebound according to the Bashore rebound test under ASTM D2632-15 of not less than 52%.

4. The tubing construction of claim 3, wherein the crosslinked rubber is a synthetic rubber.

5. The tubing construction of claim 3, wherein the crosslinked rubber is ethylene propylene diene monomer (EPDM).

6. The tubing construction of claim 3, wherein the thermoplastic is polypropylene.

7. The tubing construction of claim 1, wherein the at least one layer is extruded to form the tubing construction.

8. The tubing construction of claim 1, wherein the tubing construction is a multilayer tubing construction comprising one or more additional layers.

9. The tubing construction of claim 8, wherein the at least one layer formed from the thermoplastic vulcanizate (TPV) is the innermost layer of the multilayer tubing construction.

10. The tubing construction of claim 8, wherein the at least one layer formed from the thermoplastic vulcanizate (TPV) is the outermost layer of the multilayer tubing construction.

11. The tubing construction of claim 8, wherein the at least one additional layer is formed from a polymeric material, a thermoplastic material, a rubber, material, or a thermoplastic vulcanizate (TPV).

12. A fluid pump, comprising:
a tubing construction comprising: at least one layer formed from a thermoplastic vulcanizate (TPV); and
a rotor comprising one or more rollers configured to subject the tubing construction to cyclic loading and unloading to force fluid through the tubing construction,
wherein the tubing construction comprises a vertical rebound according to the Bashore rebound test under ASTM D2632-15 of not less than 50% and a tan delta of not greater than 0.10 as measured at 23 degrees Celsius and a frequency of 10 Hertz (Hz),
wherein the tubing construction comprises a Shore A Hardness of not less than 50A to not greater than 70A, a flowrate stability of not greater than +/−10% for a period of not less than 500 hours, a compression set of not greater than 26% at a temperature of not less than 150 degrees Fahrenheit for not less than 20 hours or a crosslink density of not less than $0.005 \times 10^{-3}$ mol/cm$^3$ to not greater than $15 \times 10^{-3}$ mol/cm$^3$,
wherein the TPV comprises a crosslinked rubber and a thermoplastic resin.

13. A method of operating a fluid pump, comprising:
providing a fluid pump comprising a tubing construction according to claim 1;
beginning operation of the fluid pump at an initial fluid flowrate; and
maintaining a fluid flowrate not greater than +/−10% of the initial fluid flowrate for a predetermined period of time.

* * * * *